(12) United States Patent
Nagamatsu et al.

(10) Patent No.: US 11,900,571 B2
(45) Date of Patent: Feb. 13, 2024

(54) IMAGING DEVICE, IMAGE PROCESSING DEVICE, MOVING DEVICE, CONTROL METHOD, AND STORAGE MEDIUM

(71) Applicant: CANON KABUSHIKI KAISHA, Tokyo (JP)

(72) Inventors: Yasunari Nagamatsu, Kanagawa (JP); Yusuke Yamamoto, Tokyo (JP); Tohru Oyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 17/702,405

(22) Filed: Mar. 23, 2022

(65) Prior Publication Data

US 2022/0318959 A1 Oct. 6, 2022

(30) Foreign Application Priority Data

Mar. 30, 2021 (JP) ................. 2021-057193

(51) Int. Cl.
| | | |
|---|---|---|
| G06T 5/00 | (2006.01) | |
| G06T 7/90 | (2017.01) | |
| G06T 3/40 | (2006.01) | |
| H04N 23/69 | (2023.01) | |
| H04N 25/13 | (2023.01) | |

(52) U.S. Cl.
CPC ............ *G06T 5/006* (2013.01); *G06T 3/4015* (2013.01); *G06T 7/90* (2017.01); *H04N 23/69* (2023.01); *H04N 25/134* (2023.01)

(58) Field of Classification Search
None
See application file for complete search history.

(56) References Cited

U.S. PATENT DOCUMENTS

| | | | |
|---|---|---|---|
| 7,770,994 B2 | 8/2010 | Kitamura et al. | 347/15 |
| 8,068,259 B2 | 11/2011 | Tojima et al. | 358/3.26 |
| 8,917,336 B2 * | 12/2014 | Cote | H04N 23/673 348/241 |
| 9,105,078 B2 * | 8/2015 | Lim | G06T 1/20 |
| 9,760,815 B2 | 9/2017 | Takada et al. | G06K 15/1881 |

(Continued)

FOREIGN PATENT DOCUMENTS

| | | | | |
|---|---|---|---|---|
| CN | 114598827 A | * | 6/2022 | ........... G06N 3/0454 |
| JP | 2004-354572 | | 12/2004 | |
| JP | 2018-093480 | | 6/2018 | |

OTHER PUBLICATIONS

English translation of CN-114598827-A Choi et al, Jun. 2022 (Year: 2022).*

*Primary Examiner* — James M Hannett
(74) *Attorney, Agent, or Firm* — Venable LLP

(57) ABSTRACT

For example, in order to enable an RCCB sensor or a specific optical system to perform an appropriate image correction process (distortion correction and the like), an imaging device includes an imaging element, an optical system configured to form an image on an imaging surface of the imaging element and has a characteristic in which an image formation magnification differs depending on a position in the imaging surface, a demosaic unit configured to generate color image data of at least two colors from the data output from the imaging element, and a distortion correction unit configured to correct distortion of the color image data of at least two colors generated by the demosaic unit.

19 Claims, 15 Drawing Sheets

(56) References Cited

U.S. PATENT DOCUMENTS

| | | | |
|---|---|---|---|
| 2005/0244059 A1* | 11/2005 | Turski | G06V 20/653 |
| | | | 382/280 |
| 2008/0143857 A1* | 6/2008 | Shimizu | G06T 3/0012 |
| | | | 348/E3.016 |
| 2008/0158226 A1* | 7/2008 | Shimizu | G02B 13/18 |
| | | | 348/308 |
| 2012/0141027 A1* | 6/2012 | Hatakeyama | H04N 1/58 |
| | | | 382/167 |
| 2018/0348764 A1* | 12/2018 | Zhang | G05D 1/0669 |
| 2019/0058811 A1* | 2/2019 | Douady-Pleven | H04N 1/3876 |
| 2019/0260927 A1* | 8/2019 | Thiele | B33Y 80/00 |
| 2019/0327430 A1* | 10/2019 | Kawazu | H04N 25/772 |

* cited by examiner

FIG. 3A

RGGB SENSOR (BAYER ARRAY)

| R | G | R | G | R | G | R |
|---|---|---|---|---|---|---|
| G | B | G | B | G | B | G |
| R | G | R | G | R | G | R |
| G | B | G | R | G | B | G |
| R | G | R | G | R | G | R |
| G | B | G | B | G | B | G |
| R | G | R | G | R | G | R |

FIG. 3B

RCCB SENSOR (BAYER ARRAY)

| R | C | R | C | R | C | R |
|---|---|---|---|---|---|---|
| C | B | C | B | C | B | C |
| R | C | R | C | R | C | R |
| C | B | C | R | C | B | C |
| R | C | R | C | R | C | R |
| C | B | C | B | C | B | C |
| R | C | R | C | R | C | R |

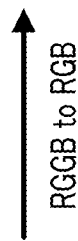
FIG. 4C
RGB IMAGE
RGGB to RGB
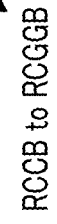
FIG. 4B
RGGB IMAGE
RCCB to RCGGB
FIG. 4A
RCCB IMAGE

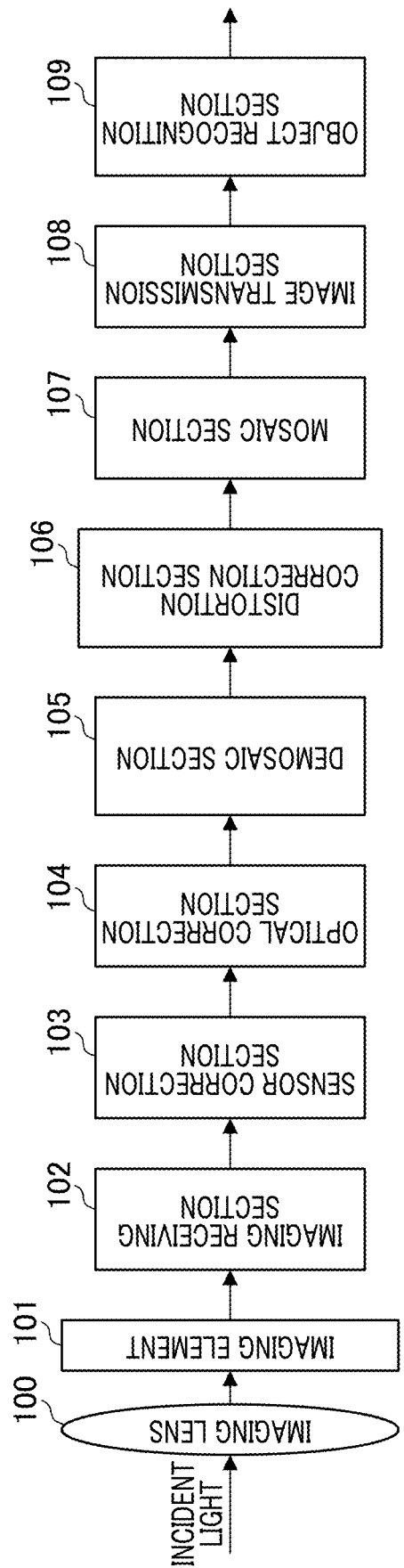

IMAGING DEVICE, IMAGE PROCESSING DEVICE, MOVING DEVICE, CONTROL METHOD, AND STORAGE MEDIUM

BACKGROUND

Field

The present disclosure relates to an imaging device, an image processing device, a moving device, a control method, a storage medium, and the like capable of performing a distortion correction process.

Description of the Related Art

In an imaging device, color image data can be generated by performing optical characteristic correction (including surrounding light quantity decrease correction and chromatic aberration correction) and a development process (including white balance adjustment and a demosaic process) on image data obtained from an imaging element. The image data before the development process is generally called RAW data.

It is common to use an RGGB sensor to generate RAW data. The RGGB sensor is an imaging element in which an optical filter in which an R filter, a G filter, and a B filter are arranged in a Bayer array in a mosaic pattern is disposed on a front surface of the imaging element. On the other hand, Japanese Patent Laid-Open No. 2018-93480 discloses a method of generating RAW data by using an RCCB sensor in which a green (G) filter is changed to a colorless (clear) filter in order to increase the sensitivity of a pixel circuit. The RCCB sensor is an imaging element in which an optical filter in which an R filter, a C filter, and a B filter are arranged in a Bayer array in a mosaic pattern is disposed on a front surface of the imaging element.

Japanese Patent Laid-Open No. 2004-354572 discloses a method of acquiring a front image by using a special optical system having a large image formation magnification in a central angle of view region in order to allow visual recognition of other vehicles, obstacles, traffic signals, signs, and the like.

However, RAW data generated by the imaging device using the RCCB sensor or the imaging device using a special optical system having a large image formation magnification in a central angle of view region may not be subjected to an appropriate image correction process by using an existing development processing circuit or retouching software. Therefore, it is difficult to obtain image data having desired image quality with an existing development processing circuit or retouching software.

Therefore, one object of the present disclosure is to enable, for example, an RCCB sensor or a specific optical system to perform an appropriate image correction process (distortion correction and the like).

SUMMARY

In order to solve the above problems, there is provided an imaging device according to one aspect of the present disclosure including an imaging element; an optical system configured to form an image on an imaging surface of the imaging element and has a characteristic in which an image formation magnification differs depending on a position in the imaging surface; and at least one processor or circuit configured to function as a demosaic unit configured to generate color image data of at least two colors from the data output from the imaging element, and a distortion correction unit configured to correct distortion of the color image data of at least two colors generated by the demosaic unit.

Further features of the present disclosure will become apparent from the following description of embodiments with reference to the attached drawings.

BRIEF DESCRIPTION OF THE DRAWINGS

FIGS. 3A and 3B are diagrams for describing an example of an optical filter disposed in a front surface of an imaging element in First Embodiment.

FIGS. 4A, 4B, and 4C are diagrams for describing an example of a process in a demosaic section in First Embodiment.

FIG. 11A is a block diagram for describing constituents of an imaging device in Third Embodiment.

DESCRIPTION OF THE EMBODIMENTS

Hereinafter, embodiments of the present disclosure will be described with reference to the accompanying drawings.

Hereinafter, with reference to the accompanying drawings, favorable modes of the present disclosure will be described using embodiments. In each diagram, the same reference signs are applied to the same members or elements, and repeated description will be omitted or simplified.

In the following embodiments, an imaging device (in-vehicle camera) mounted on a moving device (automobile or the like) will be described as an example of an imaging device. However, the imaging device in the following embodiments may be a digital still camera, a digital movie camera, a smartphone, a tablet computer, a network camera, a drone, a robot, or an imaging device mounted on any of other electronic apparatuses.

First Embodiment

Figure 1:
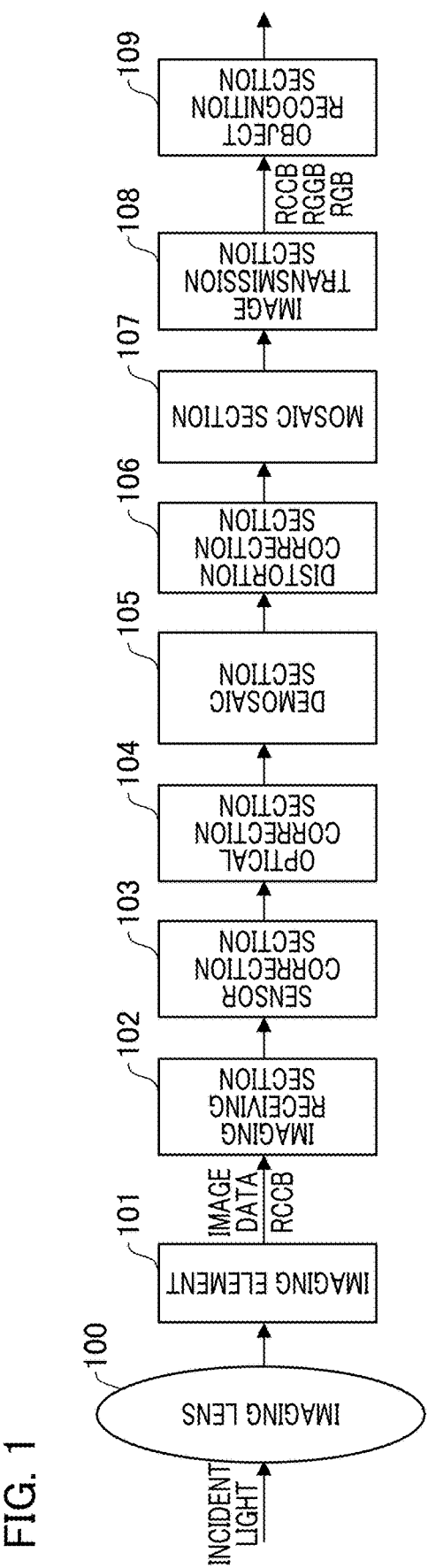
FIG. 1 is a block diagram for describing the constituents of an imaging device in First Embodiment.

FIG. 1 is a block diagram for describing constituents of an imaging device in First Embodiment.

An imaging lens unit 100 is an imaging lens unit as an optical system that forms an optical image on an imaging surface of an imaging element 101 that will be described later and has a characteristic that an image formation magnification differs depending on a position in the imaging surface.

The imaging lens unit 100 has optical characteristics that an image formation magnification differs for each angle of view such that, for example, a resolution of a central part (a central visual field part or a central angle of view region) of the imaging surface of the imaging element 101 is high, and a resolution of a peripheral part (a peripheral visual field part or a peripheral angle of view region) of the imaging surface is low. The imaging device uses the imaging lens unit 100 to form an optical image of a subject on the imaging surface of the imaging element 101. The imaging lens unit 100 is configured with a plurality of lens groups, a diaphragm, and the like.

Figure 2:
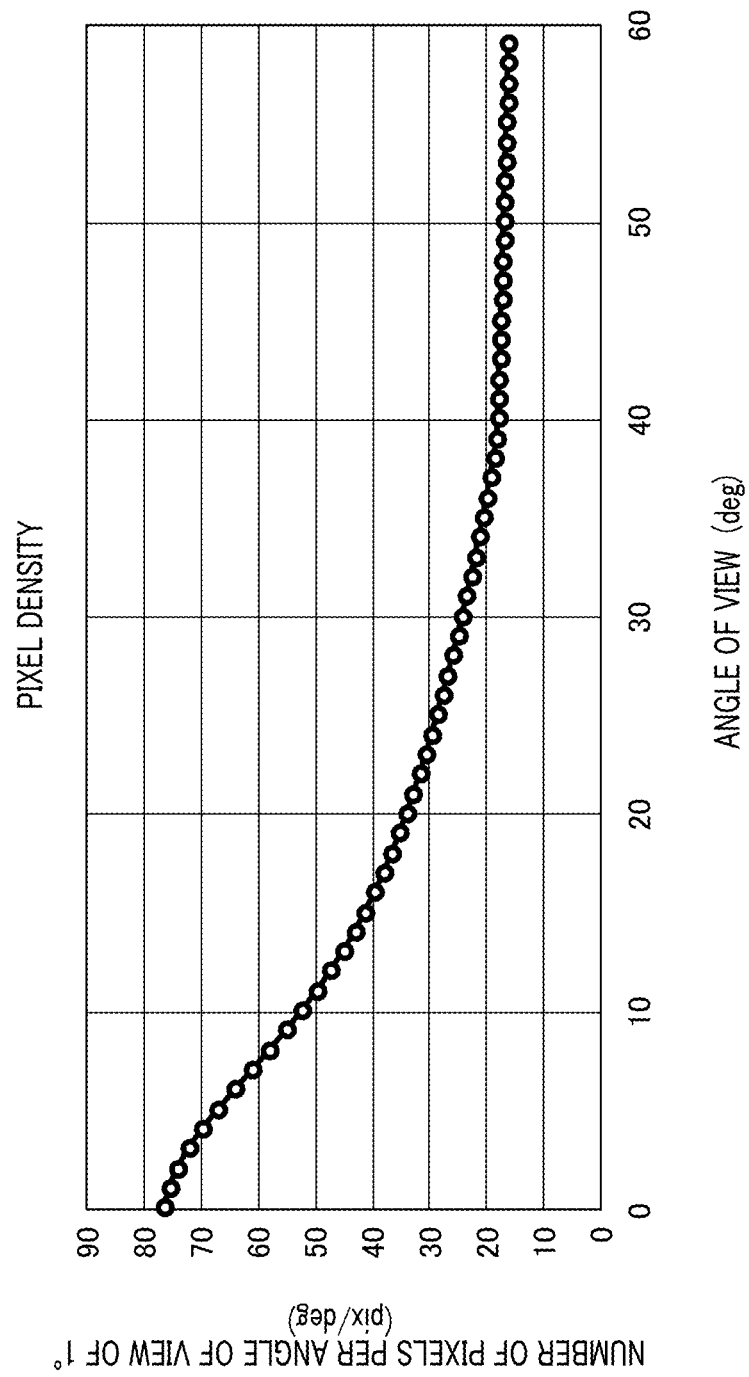
FIG. 2 is a diagram for describing an example of a pixel density for each angle of view of an imaging lens unit in First Embodiment.

FIG. 2 is a diagram for describing an example of a pixel density for each angle of view of the imaging lens unit 100. As shown in FIG. 2, in the imaging lens unit 100 in which an image formation magnification differs for each angle of view (the image formation magnification differs depending on a position in the imaging surface of the imaging element 101), the central part (a central visual field part or a central angle of view region) of the imaging surface has a small angle of view, and thus the pixel density is high. On the other hand, in the peripheral part of the imaging surface (a peripheral visual field part or a peripheral angle of view region), the larger the angle of view, the lower the pixel density.

For example, a resolution is less than 80 pixels per degree at the center of an image, but the resolution is less than 20 pixels per degree at the edge of the image with an angle of view of 60°. In an in-vehicle camera, it is desirable to recognize an object as far as possible at the center of a visual field, and thus a large number of pixels are allocated to the center of the visual field to increase the resolution of the center.

Of course, it is difficult to recognize a distant object because the number of pixels to be allocated to the peripheral part (peripheral angle of view region) is small. However, in an imaging device (such as an in-vehicle camera) that is required to recognize a distant front vehicle in the central visual field part and a nearby pedestrian in the peripheral visual field part, an optical system in which the image formation magnification differs for each angle of view (the image formation magnification differs depending on a position in the imaging surface of the imaging element 101) is useful.

The imaging element 101 is an imaging element configured with a complementary metal oxide semiconductor (CMOS) or a charge coupled device (CCD). The imaging element 101 captures an optical image (photoelectric conversion) of a subject formed on the imaging surface of the imaging element 101 via the imaging lens unit 100, and generates image data (RAW data) corresponding to the captured image. R filters, G filters, B filters, or C filters are arranged in a mosaic pattern, for example, in a Bayer array on the front surface of the imaging element 101.

The R filter is a color filter through which red light is transmitted, the G filter is a color filter through which green light is transmitted, and the B filter is a color filter through which blue light is transmitted. The C filter is a colorless filter through which colorless light is transmitted. By arranging these optical filters on the front surface of the imaging element 101, red, green, blue, or colorless light is received by each pixel of the imaging element 101.

FIGS. 3A and 3B are diagrams for describing an example of an optical filter arranged in front of the imaging element 101 in the First Embodiment. FIG. 3A shows an example of an optical filter in which the R filter, the G filter, and the B filter are arranged in a Bayer array in a mosaic pattern. FIG. 3B shows an example of an optical filter in which the R filter, the C filter, and the B filter are arranged in a Bayer array in a mosaic pattern. Here, the Bayer array refers to a color array in which adjacent colors (including colorless) are different from each other.

In First Embodiment, the description will be made assuming that the imaging element 101 is an RCCB sensor, but the imaging element 101 may be an RGGB sensor. The RCCB sensor is an imaging device in which an optical filter in which an R filter, a C filter, and a B filter are arranged in a Bayer array in a mosaic pattern is disposed on a front surface of the imaging element. The RGGB sensor is an imaging element in which an optical filter in which an R filter, a G filter, and a B filter are arranged in a Bayer array in a mosaic pattern is disposed on a front surface of the imaging device.

If the imaging element 101 is an RCCB sensor, image data (RAW data) generated by the imaging element 101 will be referred to as RCCB image data. If the imaging element 101 is an RGGB sensor, image data (RAW data) generated by the imaging element 101 will be referred to as RGGB image data.

The imaging element 101 is not limited to the RCCB sensor and the RGGB sensor. For example, the imaging element 101 may be an imaging element in which an optical filter having a Bayer array configured with a combination of a complementary color filter and a primary color filter is disposed on a front surface of the imaging element. Alternatively, the imaging element 101 may be an imaging element (RGB-IR type imaging element) in which an RGB-IR filter is disposed on the entire surface of the imaging element. Here, the RGB-IR filter is an array of R, G, and B filters in which IR filters (optical filters through which infrared light is transmitted) are discretely arranged at predetermined periods.

An image data receiving section 102 receives RCCB image data generated by the imaging element 101 and transmits the RCCB image data to a sensor correction section 103 in the subsequent stage. If the imaging element 101 is an RGGB sensor, the image data receiving section 102 receives RGGB image data generated by the imaging element 101 and transmits the RGGB image data to the sensor correction section 103 in the subsequent stage.

The sensor correction section 103 performs sensor characteristic correction that is correction related to sensor characteristics specific to the imaging element 101, on the RCCB image data generated by the imaging element 101. The sensor characteristic correction includes, for example, at least one of fixed pattern noise correction, scratch correction, and dark correction for noise suppression. If the imaging element 101 is an RGGB sensor, the sensor correction section 103 performs the sensor characteristic correction on the RGGB image data generated by the imaging element 101.

The optical correction section 104 performs optical characteristic correction that is correction related to optical characteristics of the imaging lens unit 100, on the RCCB image data processed by the sensor correction section 103. The optical characteristic correction includes, for example, at least one of surrounding light quantity decrease correction for correcting a decrease in a light quantity in a peripheral angle of view region and chromatic aberration correction for correcting a chromatic aberration of the lens. It is desirable that the sensor correction section 103 and the optical correction section 104 are disposed on a front stage of the demosaic section 105 that will be described later. If the imaging element 101 is an RGGB sensor, the optical correction section 104 performs the optical characteristic correction on the RGGB image data generated by the imaging element 101.

In the RCCB image data generated by the imaging element 101 in which Bayer array type optical filters are arranged, data for each pixel corresponds to red (R), colorless (C), or blue (B). Therefore, a demosaic section 105 generates RGGB image data from the RCCB image data processed by the optical correction section 104, and performs a demosaic process (or a color synchronization process) on the generated RGGB image data.

By performing the demosaic process, the demosaic section 105 can generate three-color data (R, G, and B data) for all the pixels and thus generate RGB color image data. Here, the RGB color image data includes color image data formed of R components of all pixels, color image data formed of G components of all pixels, and color image data formed of B components of all pixels.

The demosaic section 105 may also generate RGGB image data from the RCCB image data processed by the optical correction section 104 and supply the generated RGGB image data to an image data transmission section 108 without performing a demosaic process.

If the imaging element 101 is an RGGB sensor, the demosaic section 105 performs a demosaic process (or a color synchronization process) on the RGGB image data processed by the optical correction section 104 to generate RGB color image data. If the imaging element 101 is an RGGB sensor, the demosaic section 105 may generate RCCB image data from the RGGB image data processed by the optical correction section 104, and supply the generated RCCB image data to the image data transmission section 108 without performing a demosaic process. As described above, the demosaic section 105 may generate color image data of at least two colors (R and B) from the RCCB image data (or RGGB image data) processed by the optical correction section 104.

A distortion correction section 106 performs distortion correction on the RGB color image data generated by using an optical system in which an image formation magnification differs for each angle of view (the image formation magnification differs depending on a position in the imaging surface of the imaging element 101). False colors occur when distortion correction is performed on image data before the demosaic process is performed. Therefore, in First Embodiment, the distortion correction is performed on the RGB color image data on which the demosaic process has been performed. As described above, the distortion correction section 106 may perform the distortion correction on the color image data of at least two colors (R and B) generated by the demosaic section 105.

A mosaic section 107 performs a mosaic process (point sequencing process) on the RGB color image data on which the distortion correction has been performed by the distortion correction section 106. Consequently, the mosaic section 107 can generate RGGB image data subjected to the distortion correction. The mosaic section 107 may also generate RCCB image data from the RGGB image data subjected to the distortion correction. Consequently, the RGGB image data (or RCCB image data) subjected to the distortion correction is supplied from the mosaic section 107 to the image data transmission section 108.

The image data transmission section 108 can transmit the RCCB image data processed by the optical correction section 104 and the RGGB image data generated by the demosaic section 105 as RAW data to an image processing device separate from the imaging device. The image data transmission section 108 can also transmit the RGB color image data generated by the demosaic section 105 to the image processing device. The image data transmission section 108 can also transmit the RGGB image data or the RCCB image data generated by the mosaic section 107 to the image processing device.

The image data transmission section 108 can communicate with the image processing device via a wireless communication network or a wired communication network. If the imaging element 101 is an RGGB sensor, the image data transmission section 108 may transmit the RGGB image data processed by the optical correction section 104 and the RCCB image data generated by the demosaic section 105 as RAW data to the image processing device separate from the imaging device.

If the imaging element 101 is an RGGB sensor, the image data transmission section 108 may also transmit the RGB color image data generated by the demosaic section 105 to the image processing device. If the imaging element 101 is an RGGB sensor, the image data transmission section 108 may also transmit the RCCB image data or the RGGB image data generated by the mosaic section 107 to the image processing device.

The imaging device further includes a computer such as a processor, a central processing unit (CPU), or a microcomputer, and a memory that stores a program executed by the computer. The computer of the imaging device may control an operation of the imaging device that will be described later by executing the program stored in the memory. The computer of the imaging device may operate as a controller of the imaging device.

The image processing device has an object recognition section 109 for image recognition of an object. The image processing device further includes a computer such as a processor, a central processing unit (CPU), or a microcomputer, and a memory that stores a program executed by the computer. The computer of the image processing device can control the operation of the image processing device that will be described later by executing the program stored in the memory. The computer of the image processing device may operate as a controller of the image processing device.

A general imaging device can perform correction for a general-purpose imaging element or a general-purpose optical system, but cannot be fully compatible with a special optical system having characteristics in which an image formation magnification differs for each angle of view such as in First Embodiment. Thus, by performing distortion correction by using the distortion correction section 106 having the configuration as described in First Embodiment, it is possible to improve an object recognition ratio in the subsequent stage.

The imaging device in First Embodiment performs distortion correction according to the optical system having such special characteristics after a demosaic process, and thus image distortion correction can be performed to the extent that at least the object recognition section 109 of the image processing device can perform image recognition. The imaging device may output the RGB color image data subjected to the distortion correction to the object recognition section 109. In the imaging device of First Embodiment, the object recognition section 109 of the image processing device performs a recognition process by using image data in the Bayer array order of the RGGB pixel array. Therefore, the mosaic section 107 inversely converts the RGB color image data to be image data in the Bayer array order of the RGGB pixel array (reduces an amount of data to be transferred after returning the image data to the Bayer array by thinning out color information).

If the R, B, or C filters are arranged in a predetermined array on the front surface of each pixel of the imaging element 101, the mosaic section 107 performs a mosaic process (point sequencing process) on color image data of at least two colors (R and B). Consequently, the color image data of at least two colors are in the same order as that of the array of the optical filters arranged on the front surface of the imaging element 101.

Therefore, the image data (the RAW image data, the RGGB image data, the RCCB image data, or the RGB color image data) is transmitted to the image processing device via the image data transmission section 108. However, if the object recognition section 109 of the image processing device performs a recognition process by using the RGB color image data, the output from the distortion correction section 106 may be supplied to the image processing device without being subjected to inverse conversion by the mosaic section 107.

FIG. 4 is a diagram for describing an example of a process in the demosaic section 105 in First Embodiment.

In First Embodiment, first, RCCB image data shown in FIG. 4A is converted to general RGGB image data shown in FIG. 4B. The conversion from the RCCB image data to the RGGB image data is realized by generating G pixel data from C pixel data and RB pixel data by using the following Equations (1) to (3).

If G pixel data is generated from C pixel data (1 pixel) and its top, bottom, left, and right RB pixel data (4 pixels)

$$R=R1+R2 \quad (1)$$

$$B=B1+B2 \quad (2)$$

$$G=(2C-0.299R-0.114B)/0.587/2 \quad (3)$$

As described above, if G corresponding to C in a block A1 in FIG. 4A is calculated, first, the upper and lower R1 and R2 are added to obtain R, then the left and right B1 and B2 are added to obtain B, and G is calculated from R, B and C. If G corresponding to C in a block A2 in FIG. 4A is calculated, positions of R and B are only reversed, and thus calculation can be performed in the same manner.

In First Embodiment, G is obtained by using the above Equations (1) to (3), but calculation coefficients are not limited to the above and may be appropriately adjusted according to imaging environments.

After generating the general RGGB image data according to the above method, it is possible to easily generate RGB color image data by using a general demosaic method. As another demosaic method that can be used in First Embodiment, there is, for example, adaptive color plane interpolation (ACPI). In the ACPI, it is determined that an edge direction of a missing pixel is either vertical or horizontal, interpolation is performed along a direction of an edge with a small spatial gradient, and a value with strong continuity is obtained such that generation of a false color can be suppressed.

In First Embodiment, consistency hue based interpolation (CHBI) or primary-consistent soft decision (PCSD) may be used for the demosaic process. in First Embodiment, gradient based threshold free (GBTF) may be used for the demosaic process.

In the above description, RAW data that is image data of the RCCB pixel array from the imaging element 101 has been described. However, image data of the RGB-IR pixel array that can image an infrared light component is also temporarily converted into image data of the general RGGB pixel array, and thus the above various demosaic methods can be widely used.

FIG. 5 is a diagram for describing an example of the distortion correction process in First Embodiment.

Figure 5A:
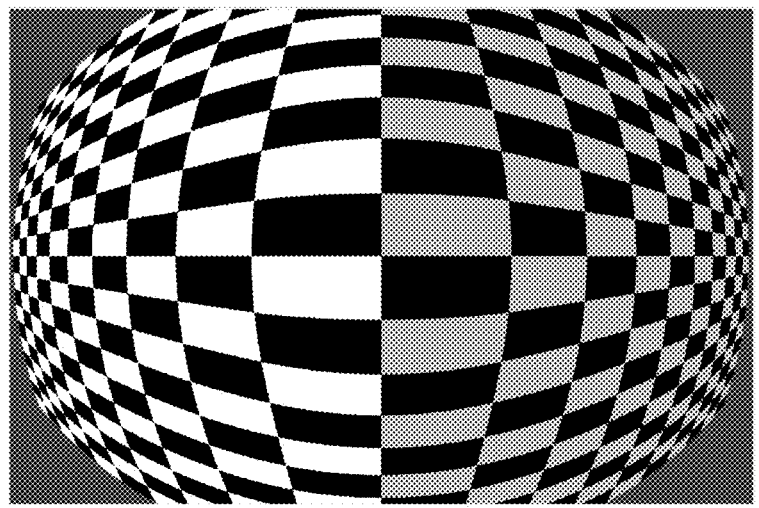
FIGS. 5A and 5B are diagrams for describing an example of a distortion correction process in First Embodiment.

If an image is captured with an optical system in which an image formation magnification differs for each angle of view (the image formation magnification differs depending on a position in the imaging surface of the imaging element 101) such as in First Embodiment, a distorted image as shown in FIG. 5A is obtained. Black and white regions in a checkered pattern in the figure have the same size in an actual subject, but due to the optical system in which the image formation magnification differs for each angle of view, the checkered pattern in the central visual field part (central angle of view region) is enlarged and the checkered pattern in the peripheral visual field part (peripheral angle of view region) is reduced. As shown in the pixel density for each angle of view in FIG. 2, the central visual field part (central angle of view region) has a high resolution, and the peripheral visual field part (peripheral angle of view region) has a low resolution.

The image processing device of the in-vehicle system performs a recognition process such as AI on an input image and detects an object (for example, a front vehicle or a pedestrian). If such a distorted image from the special optical system is input to the image processing device in the subsequent stage without any processing, there is concern that the object recognition may not function properly due to a large discrepancy between the input image used for the prior learning data and the distorted input image. In First Embodiment, since the optical system in which the image formation magnification differs for each angle of view is optically designed to be useful for in-vehicle systems with respect to the front and the surroundings as described above, if general object recognition is used without any processing, a recognition ratio will decrease.

Figure 5B:
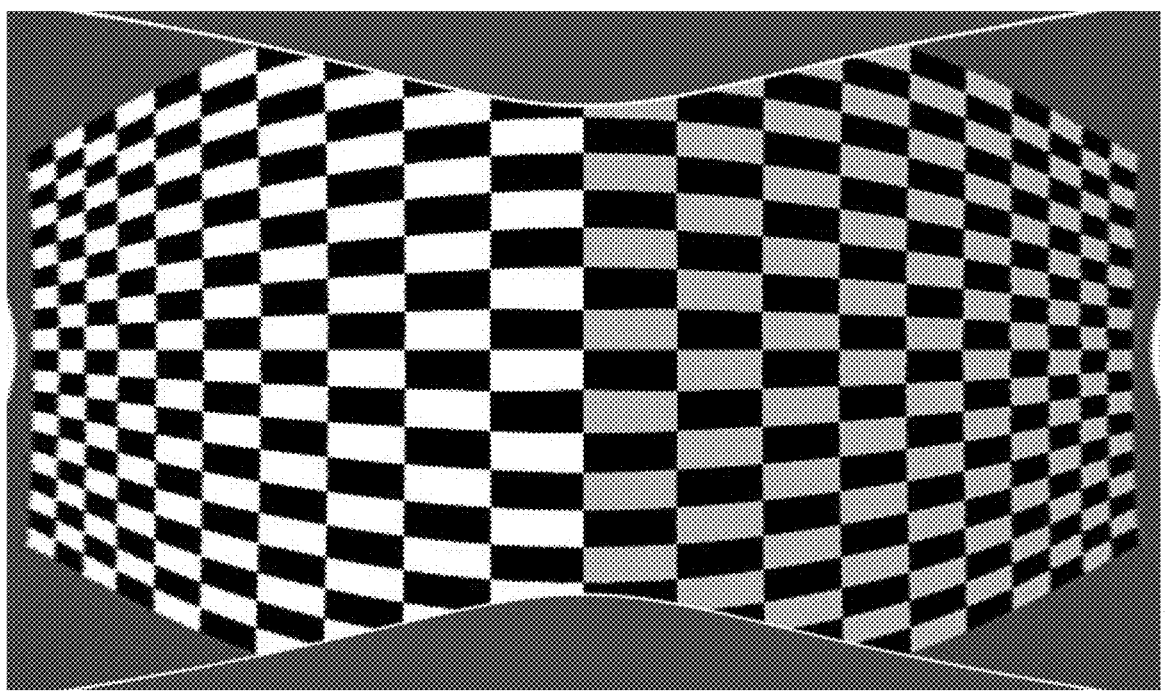

Therefore, by performing distortion correction with the configuration of First Embodiment, it is possible to perform desired object recognition even with a general object recognition process. FIG. 5B is a cylindrical image obtained by correcting the distorted image in FIG. 5A. Although distortion remains in the horizontal lines, the vertical lines are straightened, and the distortion is relatively relaxed at the edges (peripheral parts) of the image, and an object recognition ratio is sufficiently improved compared with that in the distorted image in FIG. 5A. In First Embodiment, since the distortion is corrected after the demosaic process, the occurrence of false color can be suppressed and an object recognition ratio can be improved.

Figure 6:
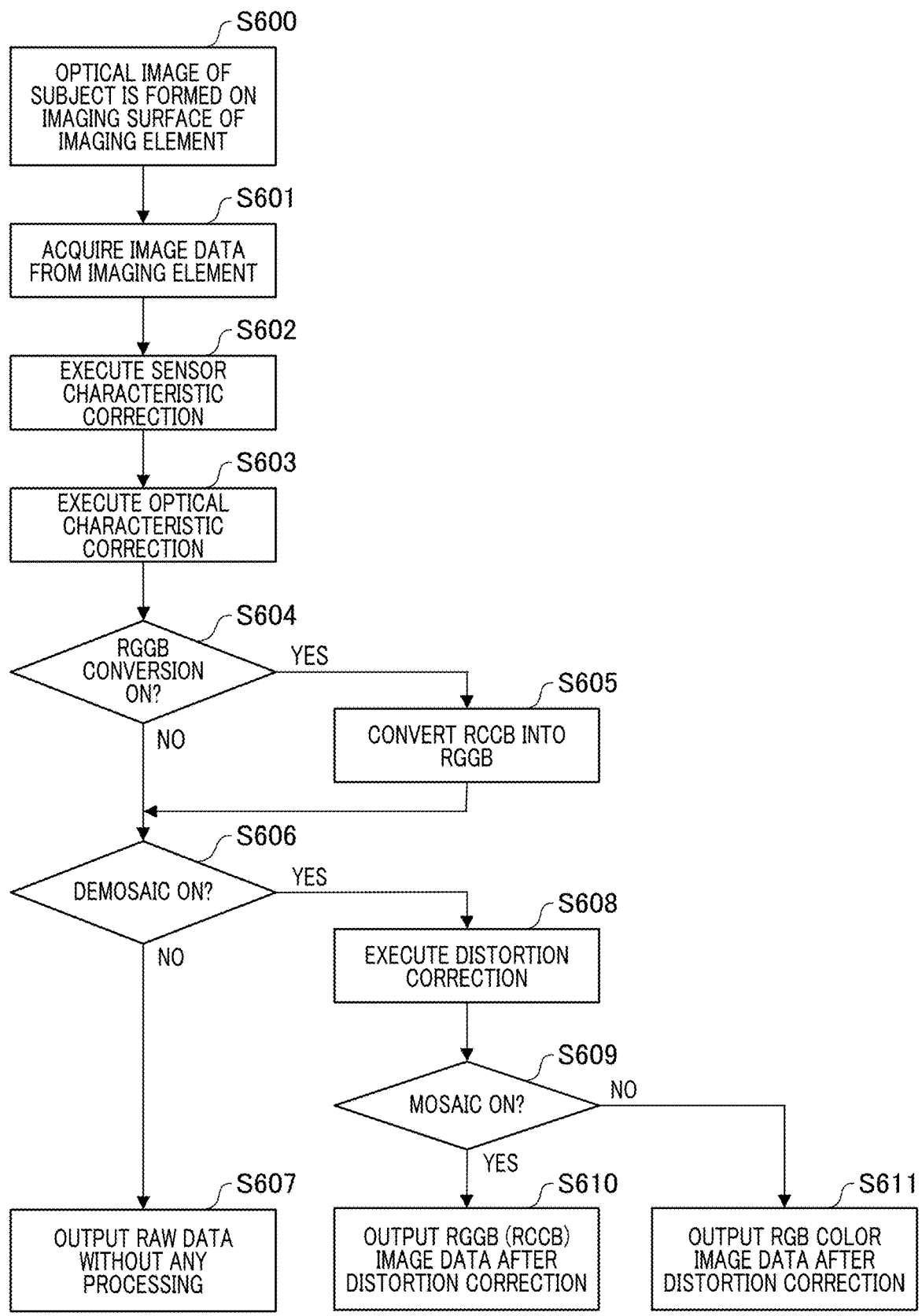
FIG. 6 is a flowchart for describing a process performed by the imaging device in the First Embodiment.

Next, a process performed by the imaging device in First Embodiment will be described with reference to a flowchart of FIG. 6. The controller of the imaging device may control the process shown in FIG. 6 by executing the program stored in the memory of the imaging device.

In step S600, an optical image of a subject is formed on the imaging surface of the imaging element 101 via the imaging lens unit 100, and the process proceeds to step S601.

In step S601, the imaging element 101 captures the optical image of the subject formed on the imaging surface, generates RCCB image data (RAW data) corresponding to the captured image, and proceeds to step S602.

In step S602, the sensor correction section 103 performs sensor characteristic correction (correction related to the sensor characteristics specific to the imaging element 101) on the RCCB image data generated by the imaging element 101, and proceeds to step S603. The sensor characteristic correction includes, for example, at least one of fixed pattern noise correction, scratch correction, and dark correction.

In step S603, the optical correction section 104 performs optical characteristic correction (correction related to the optical characteristics of the imaging lens unit 100) on the RCCB image data processed by the sensor correction section 103, and proceeds to step S604. The optical characteristic correction includes, for example, at least one of surrounding light quantity decrease correction and chromatic aberration correction. The chromatic aberration correction includes at least one of luminance unevenness correction and color shift correction. The luminance unevenness correction is a correction process for correcting luminance unevenness of a plurality of color image data caused by optical characteristics such as chromatic aberration. The color shift correction is a correction process for correcting a color shift of a plurality of color image data caused by optical characteristics such as chromatic aberration.

In step S604, the controller of the imaging device determines whether or not a user setting is set to perform RGGB conversion. If the user setting is set to perform RGGB conversion, the process proceeds to step S605. If the user setting is not set to perform RGGB conversion, the process proceeds to step S606.

In step S605, the demosaic section 105 generates RGGB image data from the RCCB image data processed by the optical correction section 104, and proceeds to step S606.

In step S606, the controller of the imaging device determines whether or not the user setting is set to perform a demosaic process. If the user setting is not set to perform a demosaic process, the process proceeds to step S607. If the user setting is set to perform a demosaic process, the process proceeds to step S608.

In step S607, the image data transmission section 108 transmits the RCCB image data processed by the optical correction section 104 or the RGGB image data generated by the demosaic section 105 to the image processing device as RAW data. If the user setting is not set to perform RGGB conversion, the image data transmission section 108 transmits the RCCB image data processed by the optical correction section 104 to the image processing device as RAW data. If the user setting is set to perform RGGB conversion, the image data transmission section 108 transmits the RGGB image data generated by the demosaic section 105 to the image processing device as RAW data. If the image data generated by the imaging element 101 is transmitted to the image processing device without any processing, the sensor characteristic correction in step S602 and the optical characteristic correction in step S603 may be skipped.

In step S608, the demosaic section 105 generates RGGB image data from the RCCB image data processed by the optical correction section 104, and performs a demosaic process (or color synchronization process) on the generated RGGB image data to generate RGB color image data. In step S608, the distortion correction section 106 performs distortion correction on the RGB color image data generated by the demosaic section 105 in consideration of a distortion ratio of the imaging lens unit 100, and proceeds to step S609.

In step S609, the controller of the imaging device determines whether or not the user setting is set to perform a mosaic process. If the user setting is set to perform mosaic process, the process proceeds to step S610 in order to transmit the RGGB image data (or RCCB image data) subjected to the distortion correction to the image processing device. If the user setting is not set to perform a mosaic process, the process proceeds to step S611 in order to transmit the RGB color image data subjected to the distortion correction to the image processing device without any processing.

In step S610, the mosaic section 107 performs a mosaic process (point sequencing process) on the RGB color image data subjected to the distortion correction by the distortion correction section 106, and generates RGGB image data subjected to the distortion correction. If the user setting is set to perform RGGB conversion, the mosaic section 107 supplies the RGGB image data subjected to the distortion correction to the image data transmission section 108. If the user setting is set to perform RGGB conversion, the image data transmission section 108 transmits the RGGB image data subjected to the distortion correction to the image processing device.

On the other hand, if the user setting is not set to perform RGGB conversion, the mosaic section 107 generates RCCB image data subjected to the distortion correction from the RGGB image data subjected to the distortion correction, and supplies the RCCB image data subjected to the distortion correction to the image data transmission section 108. If the user setting is not set to perform RGGB conversion, the image data transmission section 108 transmits the RCCB image data subjected to the distortion correction to the image processing device.

In step S611, the image data transmission section 108 transmits the RGB color image data subjected to the distortion correction by the distortion correction section 106 to the image processing device.

As described above, a special optical system designed such that the image formation magnification differs for each angle of view (the image formation magnification differs depending on a position in the imaging surface of the imaging element 101) is used, and distortion correction is performed after a demosaic process. RGB color image data subjected to the distortion correction can be generated, and image data can be further generated from the RGB color image data through a mosaic process. By using such a configuration, it is possible to focus on increasing a resolution of the central part of the imaging surface, and it is possible to significantly improve an object recognition ratio in the image processing device in the subsequent stage while suppressing the generation of false colors.

Since the imaging element with a special pixel array of RCCB or RGB-IR is temporarily converted to have a general RGGB pixel array and a demosaic process and distortion correction are performed, it is possible to handle optical systems with various characteristics. It is possible to flexibly handle different types of imaging elements and different types of demosaic processes. A communication bandwidth from the imaging device to the image processing device can be reduced by performing an inverse conversion (mosaic) process on RGB color image data to generate point-sequential image data of an RGGB pixel array.

Second Embodiment

Next, an imaging device in Second Embodiment will be described.

Figure 7A:
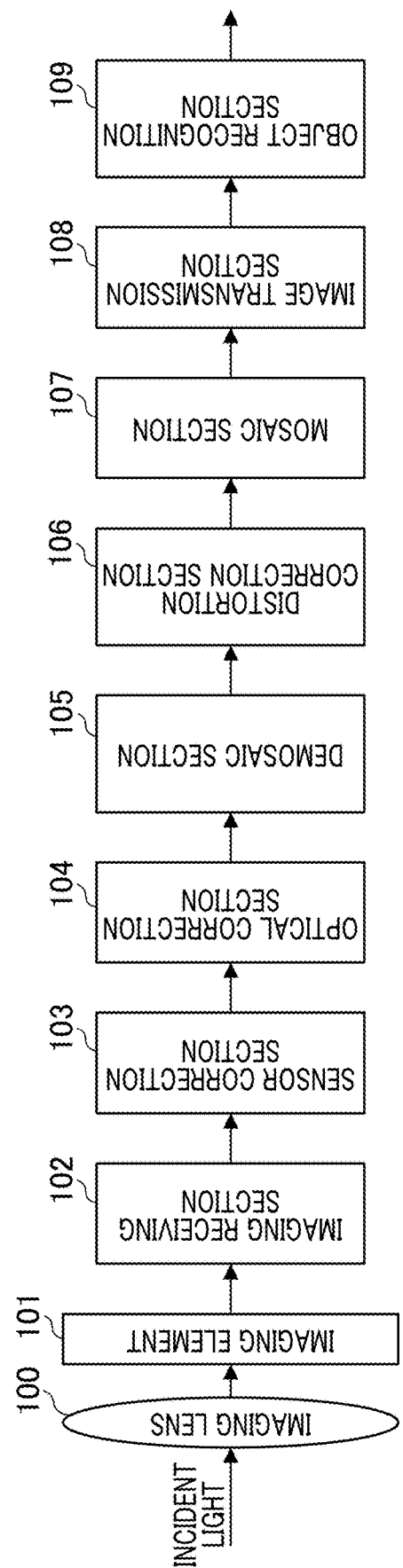
FIG. 7A is a block diagram for describing constituents of an imaging device in Second Embodiment.
Figure 7B:
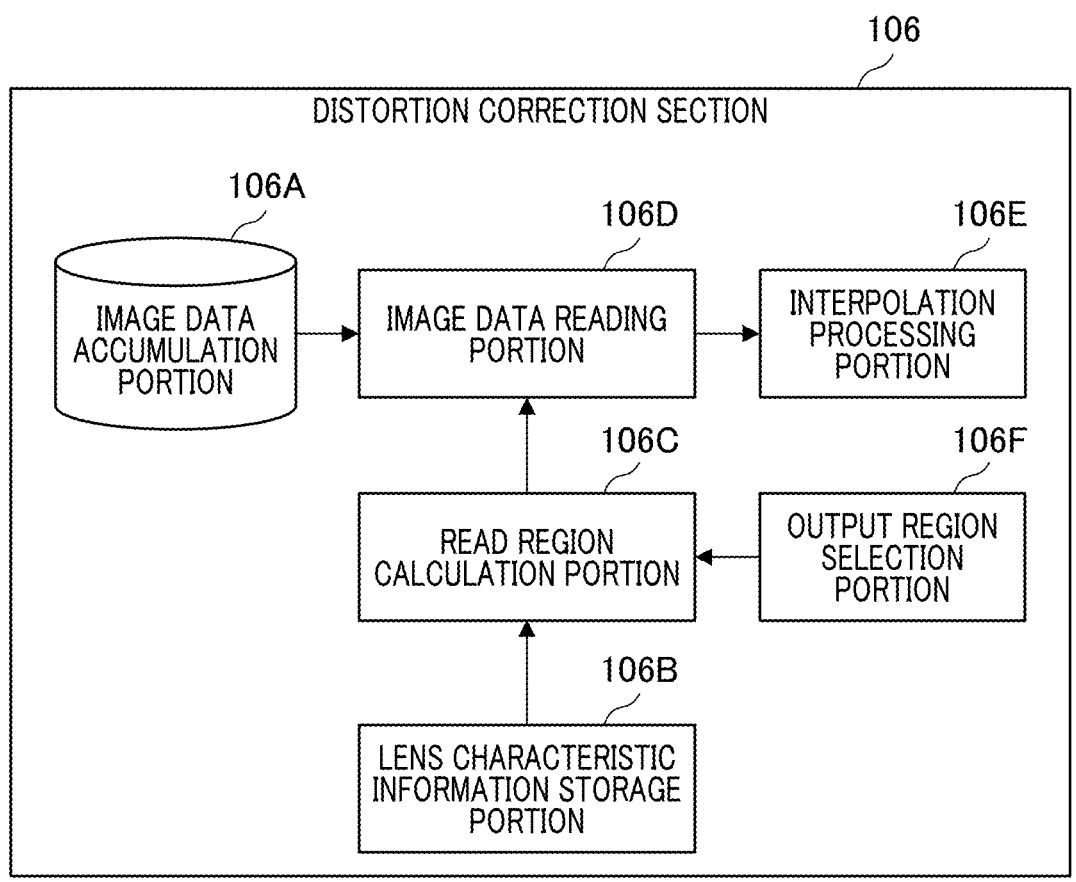
FIG. 7B is a block diagram for describing constituents of a distortion correction section in Second Embodiment.

FIG. 7A is a block diagram for describing constituents of the imaging device in Second Embodiment. FIG. 7B is a block diagram for describing the constituents of a distortion correction section 106 in Second Embodiment. The same constituents as the constituents of the imaging device in First Embodiment shown in FIG. 1 are given the same reference numerals, and the description thereof will be omitted.

Generally, in a distorted image captured by a wide-angle imaging lens unit, the visibility is reduced as described above, and a recognition ratio in an object recognition process is also reduced. Therefore, in First Embodiment, as shown in FIG. 5, high-resolution distortion correction is performed on an image captured by a wide-angle optical system.

However, the distortion correction is correction that involves calculating a correspondence relationship between input coordinates and output coordinates of each pixel data, and an amount of movement of coordinates to be referred to in the pixel data changes in a complicated manner according to an image height. Therefore, there is a problem in that a calculation load and an amount of output image data increase as the number of pixels of image data increases. In particular, as described in First Embodiment, if distortion correction is performed on an image captured by an optical system in which a resolution is high near the center of the angle of view, output image data of which a resolution is high at the entire angle of view including a wide angle of view is output. Therefore, an amount of output image data increases.

Therefore, in Second Embodiment, an amount of output image data is reduced by correcting distortion at an appropriate resolution according to a pixel density for each angle of view. A configuration of the distortion correction section 106 for that purpose will be described.

An image data accumulation portion 106A accumulates (stores) color image data of at least two colors (R and B) generated through a demosaic process in the demosaic section 105.

Figure 8:
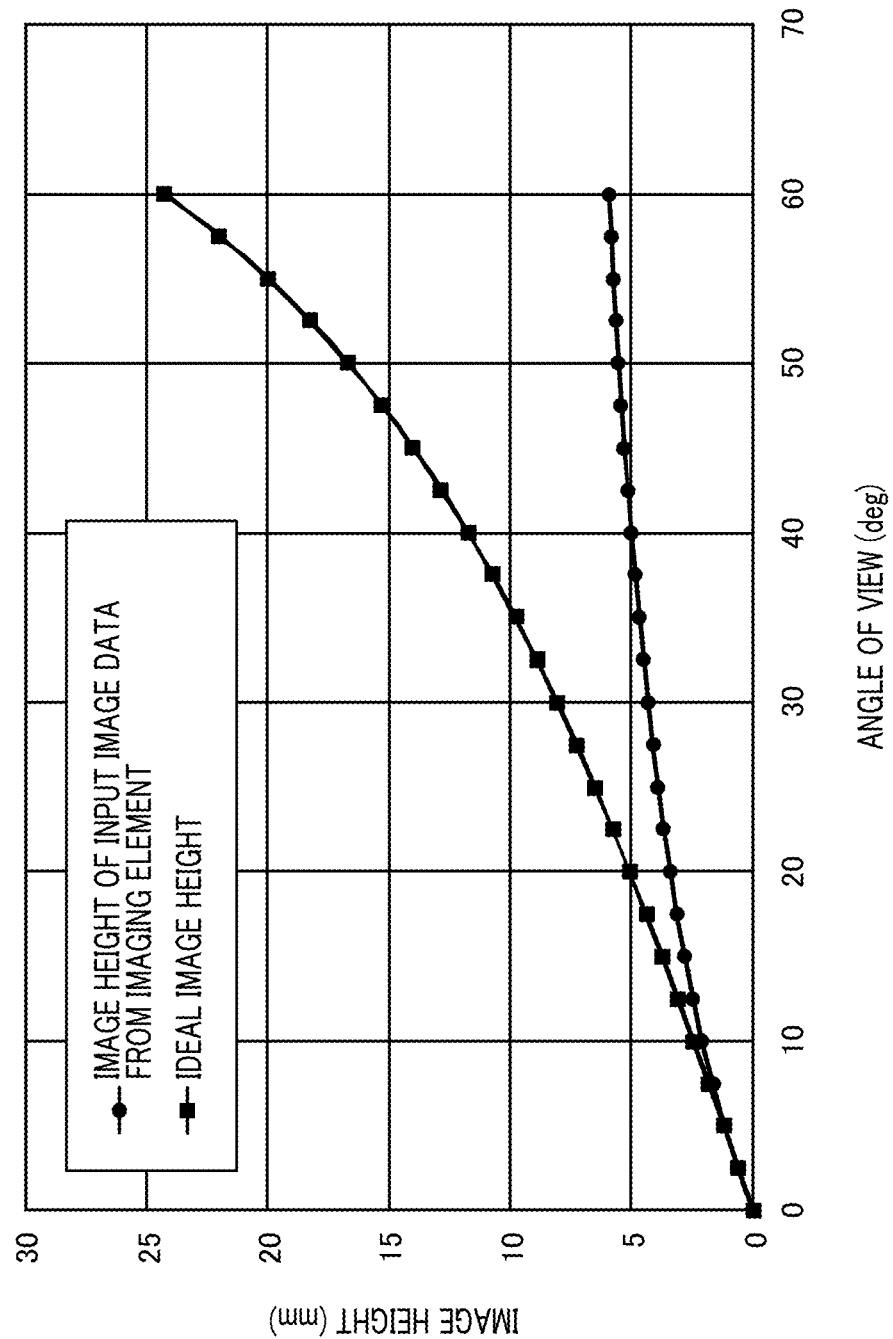
FIG. 8 is a figure for describing an example of lens characteristics data in Second Embodiment.

A lens characteristic information storage portion 106B stores lens characteristics data. FIG. 8 is a diagram for describing an example of lens characteristics data in Second Embodiment. FIG. 8 shows a relationship between an ideal image height with respect to an angle of view and an image height with respect to an angle of view of image data input from the imaging element 101. In this example, as the angle of view widens, an image height change ratio of the image data input from the imaging element 101 decreases. The distortion correction section 106 performs a process of correcting the image data input from the imaging element 101 such that the image data has an ideal image height.

The lens characteristic information storage portion 106B stores lens characteristics data as shown in FIG. 8 in a format such as a lookup table (LUT), and if angle of view information is input, information regarding an ideal image height and an actual image height is output.

A read region calculation portion 106C calculates coordinates $(X_{in}, Y_{in})$ of input image data corresponding to coordinates $(X_{out}, Y_{out})$ of output image data on the basis of information selected and input by an output region selection portion 106F by using a calculation formula shown in the following Equation (4).

$$X_{in}=X_{inc}+\alpha\times(X_{out}-X_{outc})\times R_{in}\div R_{out}$$

$$Y_{in}=Y_{inc}+\alpha\times(Y_{out}-Y_{outc})\times R_{in}\div R_{out} \quad (4)$$

$(X_{inc}, Y_{inc})$ are coordinates of the optical axis center of the input image, and are determined by installation positions of the imaging lens unit 100 and the imaging element 101. $(X_{outc}, Y_{outc})$ are coordinates of the optical axis center of the output image, and may be freely set according to an image region desired to be output. $R_{out}$ is an image height from the optical axis center of the output image, and may be calculated by using a calculation formula shown in the following Equation (5).

$$R_{out}=\sqrt{(X_{out}-X_{outc})^2+(Y_{out}-Y_{outc})^2} \quad (5)$$

$R_{in}$ is the real image height with respect to the ideal image height. A value of $R_{in}$ corresponding to $R_{out}$ is stored in the lens characteristic information storage portion 106B described above. The read region calculation portion 106C calculates an angle of view from the coordinates $(X_{out}, Y_{out})$ of the output image data, and inputs the calculated angle of view information to the lens characteristic information storage portion 106B. The lens characteristic information storage portion 106B outputs a real image height $R_{in}$ corresponding to the input angle of view and supplies the real image height to the read region calculation portion 106C.

As will be described later, α is used if a resolution of the output image data is desired to be changed. If the real image height is set to the ideal image height, α=1 may be sufficient.

The coordinates $(X_{in}, Y_{in})$ of the input image data calculated as described above are coordinates including a decimal point, and thus do not exist in the input image data. Thus, the output image data is calculated by an interpolation processing portion 106E that will be described later from image data in which input image data actually exists in the vicinity of the calculated coordinates $(X_{in}, Y_{in})$.

The read region calculation portion 106C calculates coordinates of neighboring pixels required for interpolation calculation in the interpolation processing portion 106E. If the interpolation processing portion 106E performs interpolation calculation from neighboring four pixels, it calculates four coordinates, that is, coordinates obtained by rounding down a decimal part of the calculated coordinates $(X_{in}, Y_{in})$ and coordinates obtained by rounding up a decimal part.

An image data reading portion 106D reads input image data with corresponding coordinates from the image data accumulation portion 106A on the basis of the input image data coordinates $(X_{in}, Y_{in})$ input from the read region calculation portion 106C, and outputs the input image data to the interpolation processing portion 106E.

The interpolation processing portion 106E performs interpolation calculation of the output image data by using the input image data read from the image data accumulation portion 106A by the image data reading portion 106D. Nearest neighbor interpolation, bilinear interpolation or bicubic interpolation may be used for the interpolation calculation. The output image data subjected to the interpolation calculation is output to the mosaic section 107.

An output region selection portion 106F selects a region of image data to be output to the object recognition section 109 that will be described later at a predetermined resolution. As shown in FIG. 8, a real image height differs for each angle of view, and as shown in FIG. 2, a pixel density differs for each angle of view. If the entire input image data is subjected to distortion correction while maintaining a pixel density at the angle of view of 0° at which a pixel density is highest, the resolution of the output image data is higher than the resolution of the input image data and is output in a region where the pixel density is low.

In the example shown in FIG. 2, there is a difference of about 4 times in the pixel density between the angle of view of 60° at which the pixel density is lowest and the angle of view of 0° at which the pixel density is highest. If similar processing is applied for the vertical direction in the same manner as for the horizontal direction, the resolution of the output image data is 16 times the resolution of the input image data. Since an amount of data of the output image data increases with respect to an amount of data of the input image data, a required data transfer bandwidth increases and the cost increases.

Therefore, in Second Embodiment, with respect to the input image data, two types of image data such as two pieces of output image data including low-resolution output image data indicating the entire angle of view region and high-resolution output image data in which a region is restricted are output. Through such a process, the overall amount of output image data is reduced.

The resolution of the low-resolution output image data indicating the entire region and the region of the high-resolution output image data are determined from processing details of the object recognition section 109 that performs object recognition by using the image data output from the distortion correction section 106.

In order for the object recognition section 109 to recognize an object, a resolution corresponding to a size of the object is required. For example, in order to recognize an object having a width of 0.3 m 50 m away, 10 strokes are required as the resolution of the object. As a distance increases, an object is imaged smaller, and thus it is necessary to increase the pixel density in order to maintain a resolution of the distant object. Thus, as shown in FIG. 2, the imaging lens unit having the characteristics shown in FIG. 8 is designed to have a high pixel density near the angle of view of 0° at which a distant object is imaged and a low pixel density near the angle of view of 60° at which short-distance/medium-distance objects are imaged.

In order to detect short-distance/medium-distance objects, a high resolution such as at a long distance (near the angle of view of 0°) is not required. Therefore, the resolution of the output image data indicating the entire region is the minimum required to detect short-distance/medium-distance objects. In such a case, the resolution required for object recognition cannot be obtained for a distant object near the angle of view of 0°. Since an angle of view at which a distant object is desired to be detected is restricted, high-resolution output image data only for a region where the angle of view is restricted is generated.

Generation of High-Resolution Image Data Related to Restricted Region

When generating high-resolution image data related to a restricted region, the read region calculation portion 106C described above calculates only a region in which the coordinates ($X_{out}$, $Y_{out}$) of the output image data are restricted. The output region selection portion 106F outputs the coordinates ($X_{out}$, $Y_{out}$) of the output image data of a region desired to be calculated, and the read region calculation portion 106C calculates a read region.

Generation of Low-Resolution Output Image Data

When low-resolution output image data is generated, a is changed from the above number "1". For example, it is assumed that the resolution of the input image data is 8 Mega pixels, and the resolution of the output image data is 128 Mega pixels, which is 16 times higher if a real image height is set to an ideal image height in distortion correction. In contrast, if it is desired to reduce the resolution of the output image data to ⅕₂₅ of the 128 Mega pixels, a is set to 5 and the coordinates ($X_{in}$, $Y_{in}$) of the corresponding input image data are calculated.

The object recognition section 109 performs object recognition on the basis of the color image data of which distortion has been corrected by the distortion correction section 106. For example, object recognition is performed on the input image data through, for example, deep learning using a convolutional neural network (CNN). However, an object recognition method is not limited to this. In Second Embodiment, the object recognition section 109 is included in an image processing device separate from the imaging device in the same manner as in First Embodiment. In Second Embodiment, the image data transmission section 108 can communicate with the image processing device separate from the imaging device via a wireless communication network or a wired communication network in the same manner as in First Embodiment.

In Second Embodiment, high-resolution image data related to a restricted region and low-resolution output image data are input to the object recognition section 109. As described above, when an object near an angle of view of 0° at which a distant object is imaged is recognized, the object is recognized by using the high-resolution image data related to a restricted region. When an object near the angle of view of 60° at which short-distance/medium-distance objects are imaged is recognized, the object is recognized by using the low-resolution output image data.

Next, a process performed by the imaging device in Second Embodiment will be described with reference to flowcharts of FIGS. 9 and 10. The controller of the imaging device can control the process shown in FIGS. 9 and 10 by executing the program stored in the memory of the imaging device.

Figure 9:
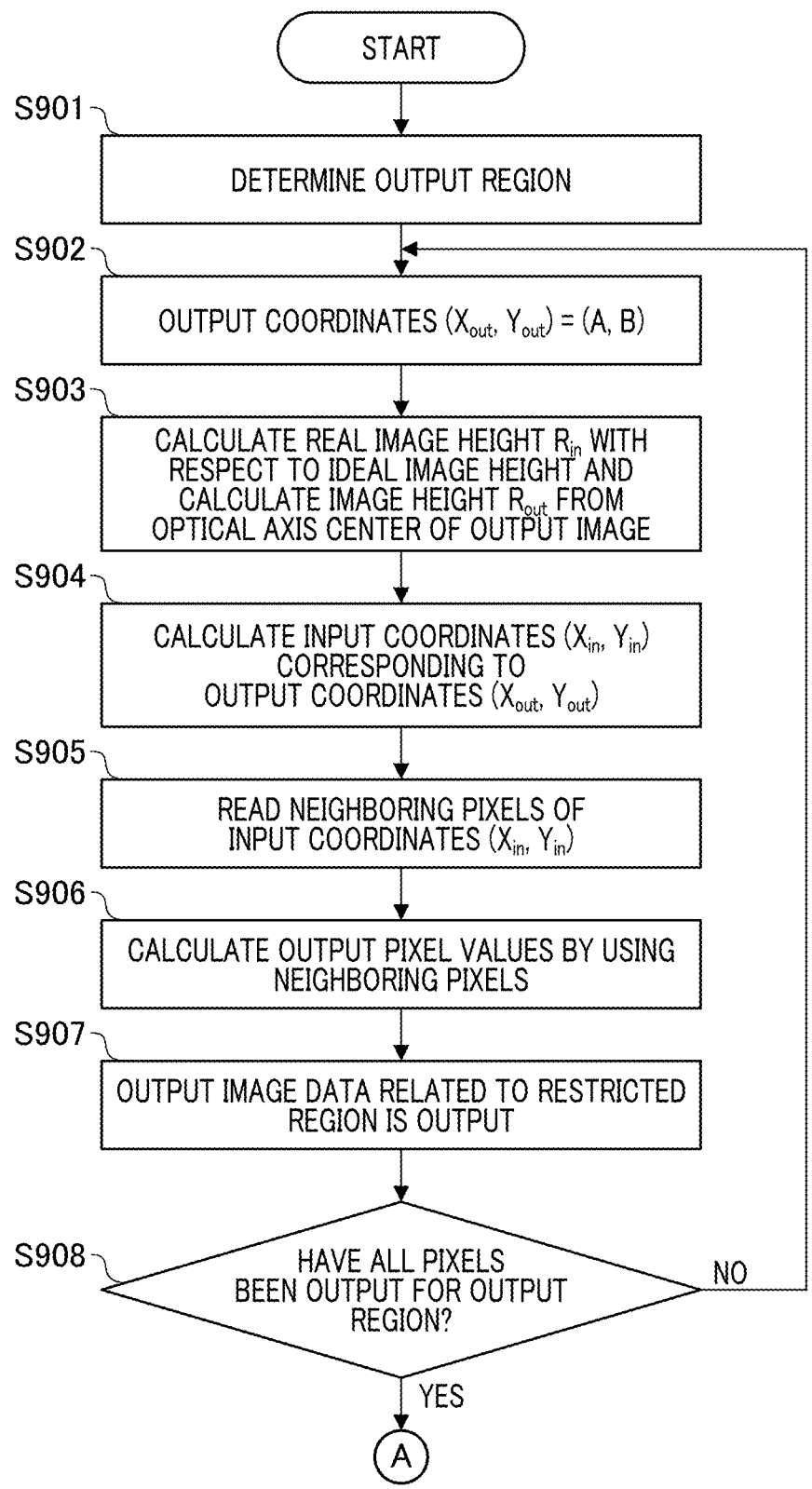
FIG. 9 is a flowchart for describing a process performed by the imaging device in Second Embodiment.

Steps S901 to S908 of FIG. 9 are processes performed if high-resolution output image data is generated from a region in the imaging surface having a high image formation magnification.

In step S901, an output region is restricted. As described above, the output region selection portion 106F selects and determines a region for outputting a high-resolution image necessary for recognizing a distant object.

In step S902, the read region calculation portion 106C specifies output coordinates ($X_{out}$, $Y_{out}$)=(A, B) of the region restricted in step S901.

In step S903, the read region calculation portion 106C calculates the real image height $R_{in}$ with respect to the ideal image height and the image height $R_{out}$ from the optical axis center of an output image for the output coordinates specified in step S902 on the basis of the lens characteristics stored in the lens characteristic information storage portion 106B.

In step S904, the read region calculation portion 106C calculates the input coordinates ($X_{in}$, $Y_{in}$) corresponding to the output coordinates by using the $R_{in}$ and $R_{out}$ calculated in step S903.

As described above, in steps S903 and S904, the read region calculation portion 106C acquires optical characteristic information from the optical characteristic information storage portion on the basis of the information input from the output region selection portion, and calculates a region read from the image data accumulation portion 106A.

In step S905, the image data reading portion 106D reads neighboring pixels of the input coordinates ($X_{in}$, $Y_{in}$) calculated in step S904 from a location where the input image data is accumulated. As described above, the image data reading portion 106D reads image data from the image data accumulation portion 106A on the basis of the information input from the read region calculation portion. In this case, what kind of neighboring pixels are read depends on an interpolation calculation method performed in step S906 that will be described later.

In step S906, the interpolation processing portion 106E performs interpolation calculation by using the neighboring pixels read in step S905, and calculates pixel values of the output coordinates ($X_{out}$, $Y_{out}$). Nearest neighbor interpolation, bilinear interpolation, or bicubic interpolation may be used for the interpolation calculation. As described above, the interpolation processing portion 106E performs the interpolation process by using the image data output from the image data reading portion.

In step S907, the output image data calculated in step S906 is output.

In step S908, it is determined whether or not the calculation of all output pixels has been completed for the output region determined in step S901. If the calculation of all output pixels has been completed, the process proceeds to step S909 in FIG. 10, and if the calculation of all output pixels has not been completed, the process returns to step S902.

Figure 10:
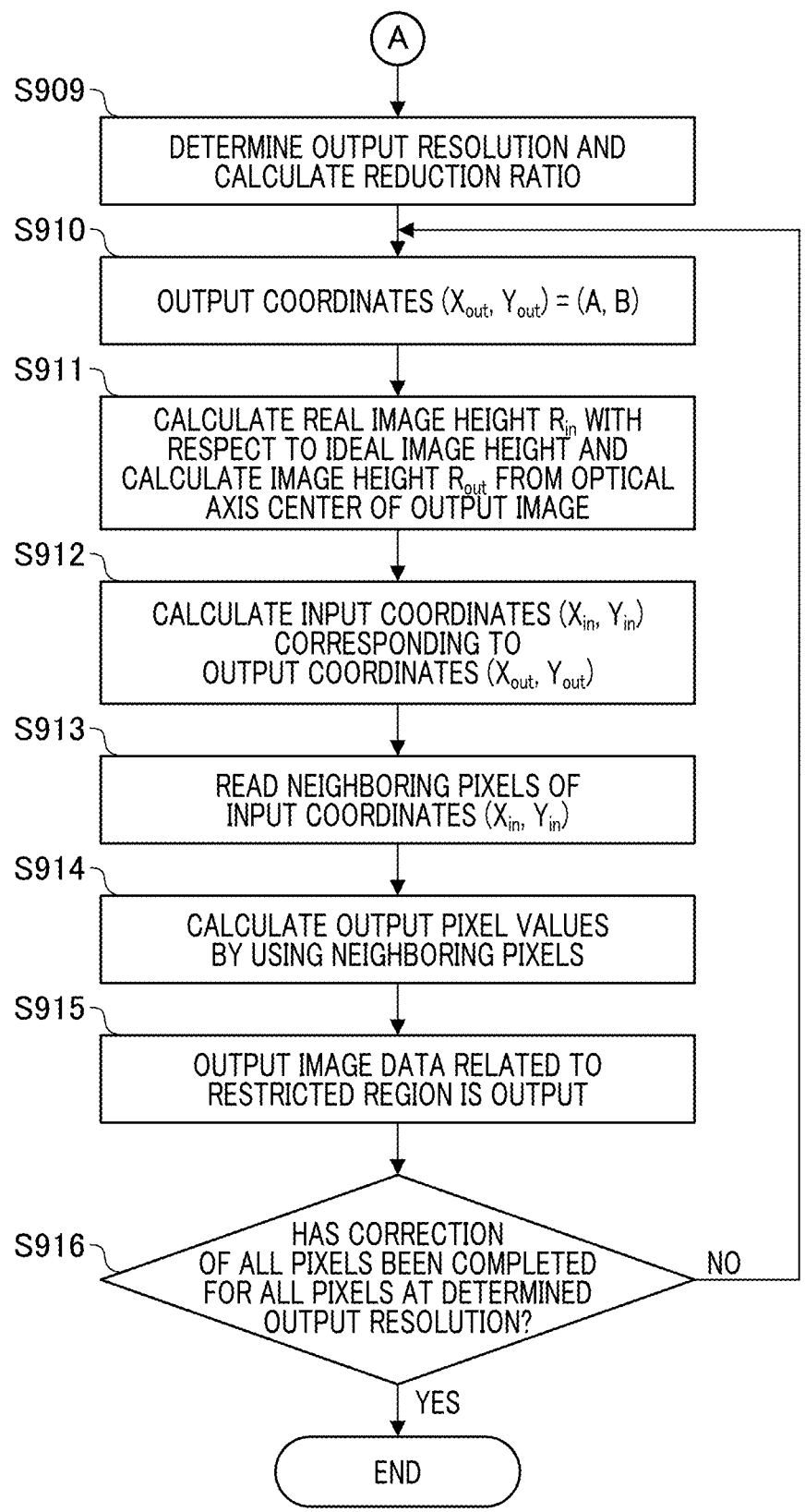
FIG. 10 is a flowchart for describing a process performed by the imaging device in Second Embodiment.

Steps S909 to S916 in FIG. 10 are processes performed if low-resolution output image data is generated from all regions (all pixels) in the imaging surface. The entire region in the imaging surface includes a region in the imaging surface having a high image formation magnification and a region in the imaging surface having a low image formation magnification.

In step S909, a resolution of the output image is determined and a reduction ratio is calculated. The reduction ratio is determined according to a resolution required to detect short-distance/medium-distance objects.

In step S910, the output coordinates ($X_{out}$, $Y_{out}$)=(A, B) corresponding to the output resolution determined in step S909 are designated.

Steps S911 to S915 are the same processes as steps S903 to S907, and output image data corresponding to the output coordinates ($X_{out}$, $Y_{out}$) designated in step S910 are calculated and output.

In step S916, it is determined whether or not the calculation of all output pixels has been completed at the output resolution determined in step S909. If the calculation of all output pixels has been completed, the process in FIG. 10 is finished, and if the calculation of all output pixels has not been completed, the process returns to step S910.

In the processes shown in FIGS. 9 and 10, high-resolution output image data related to a restricted region is generated and then low-resolution output image data is generated and transferred, but the order may be reversed.

If there is sufficient bandwidth for image transfer, two or more types of images such as a high-resolution image and a low-resolution image may be simultaneously calculated and output.

As described above, in Second Embodiment, high-resolution image data related to a restricted region and low-resolution image data for the entire angle of view region are output in distortion correction of a special optical system designed such that an image formation magnification differs for each angle of view.

As described above, the distortion correction section 106 can correct distortion of color image data of at least two colors (R and B) and generate a plurality of pieces of image data having different resolutions. The distortion correction section 106 can generate high-resolution image data from a position in the imaging surface of the imaging element 101 having a high image formation magnification, and generate low-resolution image data from a region including the position in the imaging surface having a high image formation magnification and a position in the imaging surface having a low image formation magnification. Consequently, according to Second Embodiment, it is possible to reduce an amount of data to be transferred while maintaining the necessary recognition accuracy in each of a peripheral part and a central part of a captured image and thus to reduce implementation cost such as memory reduction.

Third Embodiment

Next, an imaging device in Third Embodiment will be described.

In Second Embodiment, an appropriate distortion correction process is realized by generating high-resolution image data from a region in the imaging surface having a high image formation magnification and generating low-resolution output image data from all regions (all pixels) in the imaging surface. In Third Embodiment, image data in which an angle of view is divided into a plurality of regions is generated, and an appropriate resolution is selected according to the angle of view.

Figure 11B:
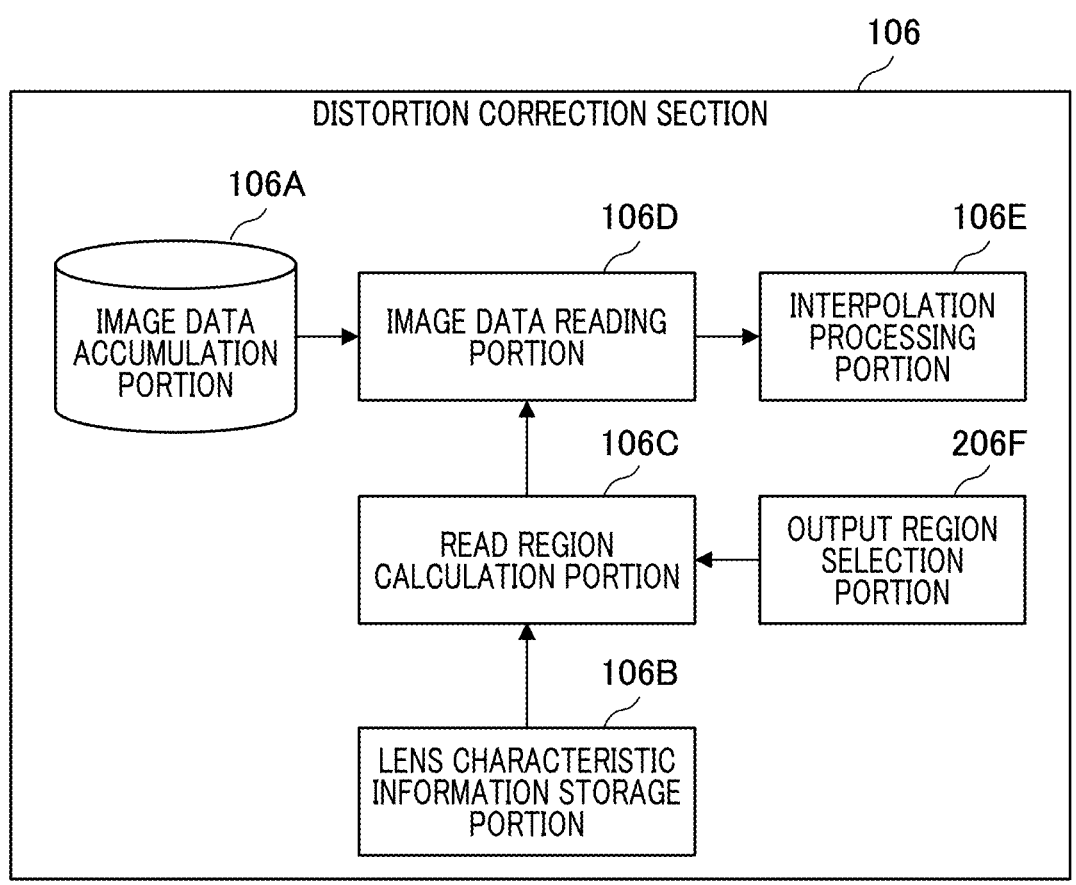
FIG. 11B is a block diagram for describing constituents of a distortion correction section in Third Embodiment.

FIG. 11A is a block diagram for describing constituents of the imaging device in Third Embodiment. FIG. 11B is a block diagram for describing constituents of a distortion correction section 106 in Third Embodiment. The constituents of the distortion correction section 106 in Third Embodiment are the same as the constituents shown in FIG. 7B except for an output region selection portion 206F. An operation of the output region selection portion 206F is different from the operation of the output region selection portion 106F. The same constituents as those in Second Embodiment shown in FIGS. 7A and 7B are given the same reference numerals, and description thereof will be omitted.

The output region selection portion 206F in Third Embodiment will be described. The output region selection portion 206F in Third Embodiment selects a region of image data to be output to the object recognition section 109, which will be described later. In Third Embodiment, the image data to be output is divided into, for example, three angle-of-view regions and output. Image data of three angles of view including a region of the angle of view of −20° to 20° near the center and regions of angles of view of −60° to −20° and 20° to 60° near the periphery are generated.

Generation of Image Data at −20° to 20° Near the Center

As shown in FIG. 8, an angle of view density is high near the center in order to detect a distant object. Therefore, a range of a region is minimized to generate high-resolution image data. A generation method is the same as the method of generating high-resolution image data related to a restricted region in Second Embodiment.

Generation of Image Data Generation at −60° to −20° or 60° to 20° Near the Periphery For a region near the periphery, a low-resolution output image is generated because the resolution near the center is not required. A generation method will be described below.

As described above, a is changed from the above number "1" described in the read region calculation portion 106C. In Second Embodiment, coordinates of input image data for all coordinates of a low-resolution output image are calculated in order to generate a low-resolution output image from the entire region in the imaging surface, whereas in Third Embodiment, only coordinates of input image data for a restricted region are calculated.

Next, a process performed by the imaging device in Third Embodiment will be described with reference to flowcharts of FIGS. 12 and 13. The controller of the imaging device can control the process shown in FIGS. 12 and 13 by executing the program stored in the memory of the imaging device.

Figure 12:
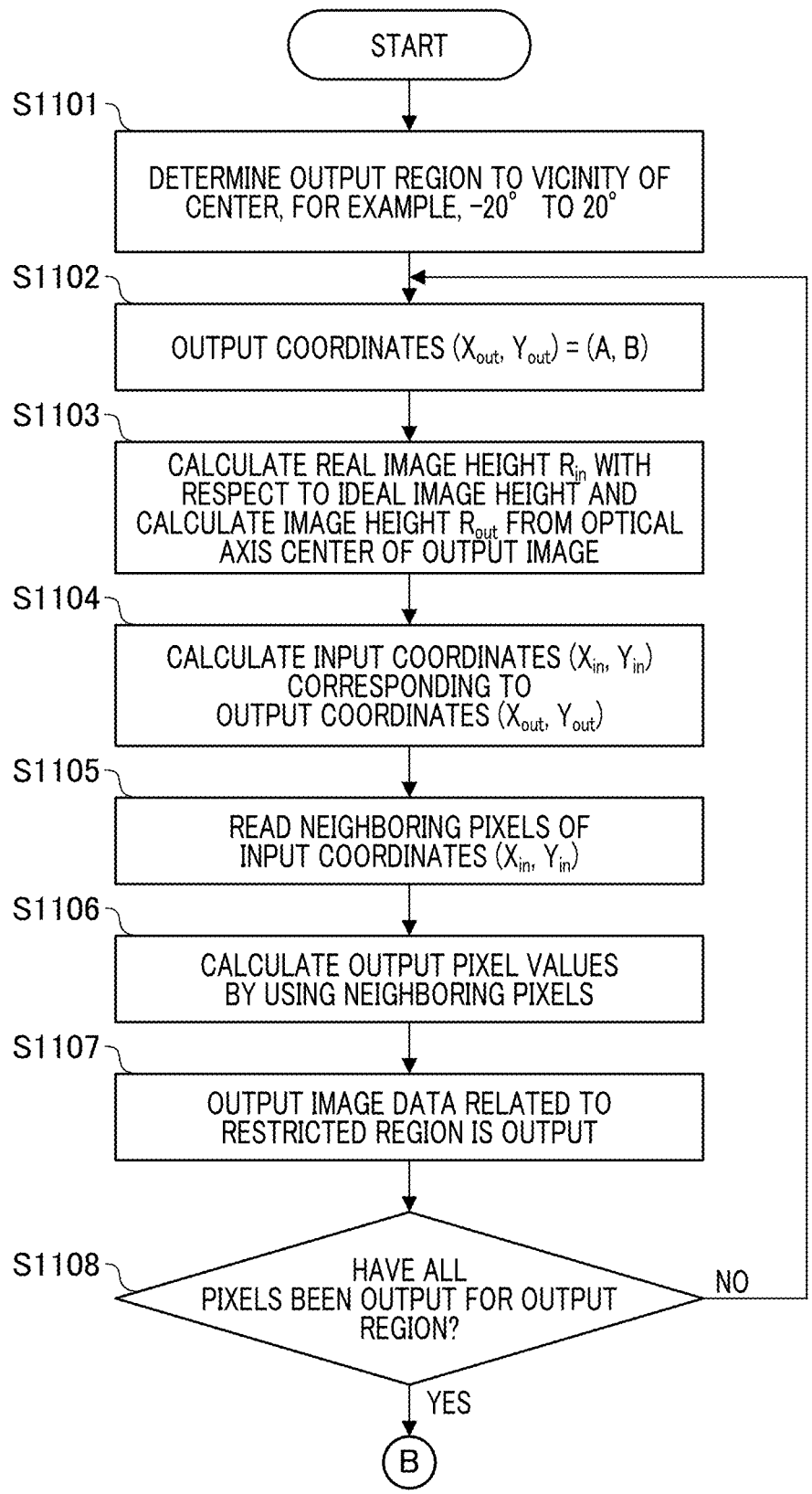
FIG. 12 is a flowchart for describing a process performed by the imaging device in Third Embodiment.

Steps S1101 to S1108 in FIG. 12 are processes performed if high-resolution output image data restricted to the vicinity of the center is generated.

In step S1101, the output region is restricted to the vicinity of the center (−20° to 20° in Third Embodiment). As described above, the resolution is set to be high because it is necessary to recognize a distant object.

In step S1102, the output coordinates $(X_{out}, Y_{out})=(A, B)$ corresponding to the region restricted in step S1101 are designated.

In step S1103, for the output coordinates designated in step S1102, the real image height $R_{in}$ with respect to an ideal image height and the image height $R_{out}$ from the optical axis center of an output image are calculated.

In step S1104, the input coordinates $(X_{in}, Y_{in})$ corresponding to the output coordinates are calculated by using the Rut and $R_{out}$ calculated in step S1103.

In step S1105, neighboring pixels of the input coordinates $(X_{in}, Y_{in})$ calculated in step S1104 are read from a location where the input image data is accumulated. In this case, what kind of neighboring pixels are read depends on an interpolation calculation method performed in step S1106 that will be described later.

In step S1106, interpolation calculation is performed by using the neighboring pixels read in step S1105, and pixel values of the output coordinates $(X_{out}, Y_{out})$ are calculated. Nearest neighbor interpolation, bilinear interpolation, or bicubic interpolation may be used for the interpolation calculation.

In step S1107, output image data of the output region calculated in step S1106 is output.

In step S1108, it is determined whether or not the calculation of all output pixels has been completed for the output region determined in step S1101. If the calculation of all output pixels has been completed, the process proceeds to step S1109 in FIG. 13, and if the calculation of all output pixels has not been completed, the process returns to step S1102.

Figure 13:
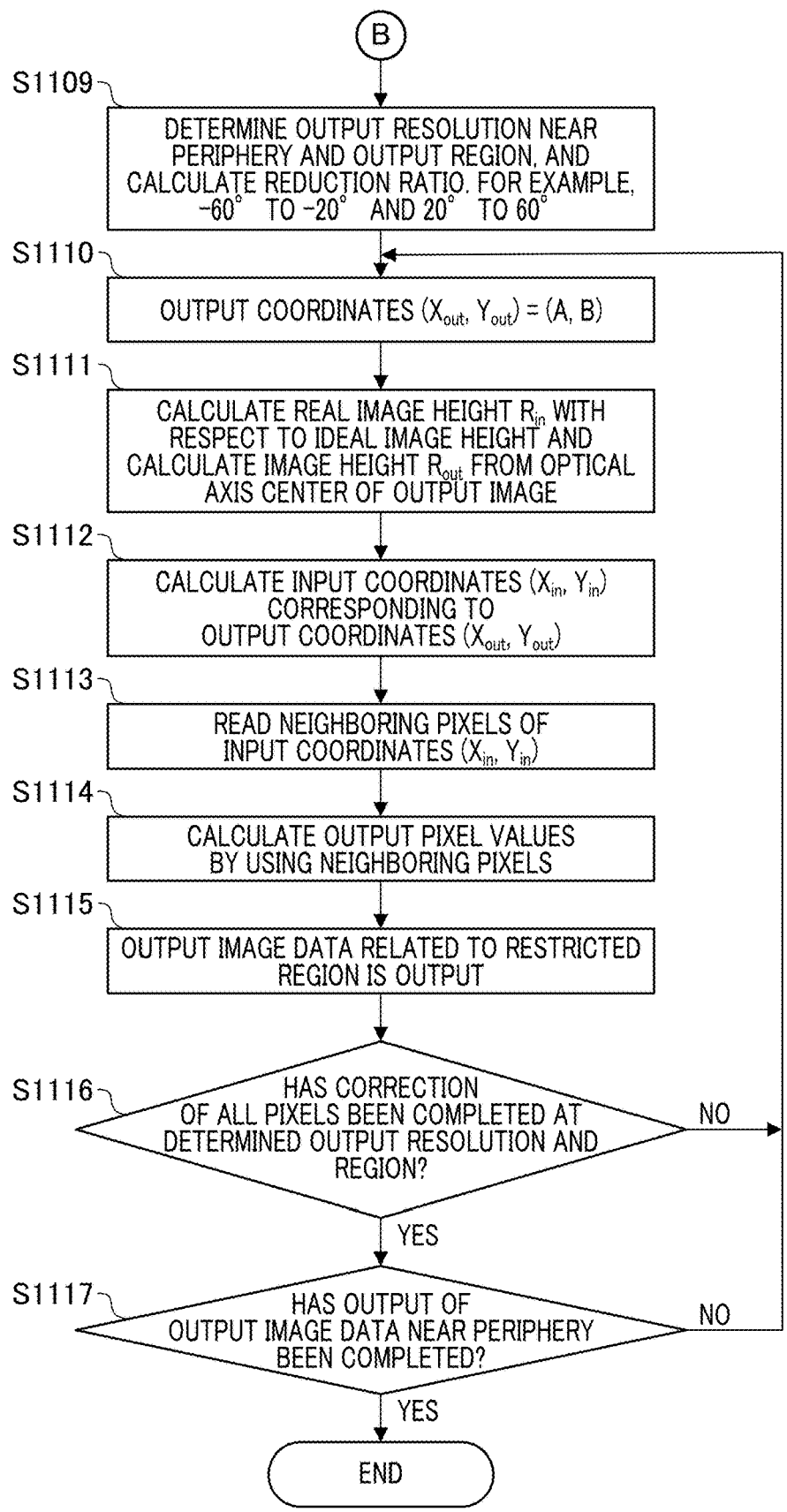
FIG. 13 is a flowchart for describing a process performed by the imaging device in Third Embodiment.

Steps S1109 to S1117 of FIG. 13 are processes performed if low-resolution output image data corresponding to a region near the periphery is generated.

In step S1109, a resolution and a region of the output image in regions near the periphery (for example, two regions of −60° to −20° and 60° to 20°) are determined, and a reduction ratio is calculated.

In step S1110, the output coordinates $(X_{out}, Y_{out})=(A, B)$ corresponding to the output resolution determined in step S1109 are designated.

Steps S1111 to S1115 are the same processes as steps S1103 to S1107, and output image data corresponding to the output coordinates $(X_{out}, Y_{out})$ designated in step S1110 are calculated and output.

In step S1116, it is determined whether or not the calculation of all output pixels has been completed for the output region determined in step S1109. If the calculation of all output pixels has been completed, the process in FIG. 13 is finished, and if the calculation of all output pixels has not been completed, the process returns to step S1110.

In step S1117, it is determined whether or not the output of the output image data has been completed for the two output regions determined in step S1109. If the output of the output image data has been completed, the process in FIG. 13 is finished, and if the output of the output image data has not been completed, the process returns to step S1110.

As described above, in Third Embodiment, in distortion correction of a special optical system designed such that an image formation magnification differs for each angle of view (the image formation magnification differs depending on a position in the imaging surface of the imaging element 101), image data in which an angle of view is divided into a plurality of regions is generated. Distortion correction is performed at an appropriate resolution according to a pixel density while maintaining the required recognition accuracy for each angle of view.

As described above, the distortion correction section 106 can correct distortion of color image data of at least two colors (R and B) and generate a plurality of pieces of image data having different resolutions. The distortion correction section 106 can generate one image data having a high resolution from a position in the imaging surface of the imaging element 101 having a high image formation magnification, and generate a plurality of low-resolution image data from a position in the imaging surface having a low image formation magnification. Consequently, also in Third Embodiment, an amount of data to be transferred can be reduced while maintaining the recognition accuracy required in each of the peripheral part and the central part of a captured image, and thus it is possible to reduce the implementation cost such as memory reduction.

As described above, in the imaging device in First to Third Embodiments, it is possible to use an optical system in which an image formation magnification differs for each angle of view (the image formation magnification differs depending on a position in the imaging surface of the imaging element 101). Consequently, it is possible to recognize a distant vehicle in front in the central visual field part more quickly, and to recognize a nearby pedestrian in the peripheral visual field part. Since distortion correction appropriate for such a special optical system can be performed with high accuracy, appropriate object recognition according to a visual field can be performed, and thus excellent effects such as prompt avoidance of accidents can be achieved.

In the above Embodiments, the distortion correction section 106 performs distortion correction such that a recognition ratio in the object recognition section 109 exceeds a predetermined threshold value. However, a second distortion correction section for performing additional distortion correction may be added to the front stage or the inside of the object recognition section 109 shown in FIG. 7A or FIG. 11A. For example, even if the recognition ratio in the object recognition section 109 is in a sufficient level, an image may not be sufficient to be viewed as an image. In this case, the second distortion correction section as described above may be added to the front stage or the inside of the object recognition section 109 shown FIG. 7A or FIG. 11A.

If the second distortion correction section is added to the front stage or the inside of the object recognition section 109 shown in FIG. 7A or FIG. 11A, a second demosaic section is added to the front stage of the second distortion correction section, and a second mosaic section is added to the rear stage of the second distortion correction section. The second demosaic section has the same configuration as that of the demosaic section 105, the second distortion correction section has the same configuration as that of the distortion correction section 106, and the second mosaic section has the same configuration as that of the mosaic section 107. A demosaic process performed by the second demosaic section may be the same as or different from the demosaic process performed by the demosaic section 105.

Distortion correction performed by the second distortion correction section may be the same as or different from the distortion correction performed by the distortion correction section 106. A mosaic process performed by the second mosaic section may be the same as or different from the mosaic process performed by the mosaic section 107. If the second distortion correction section is added to the front stage or the inside of the object recognition section 109 shown in FIG. 7A or FIG. 11A, the second demosaic section, the second distortion correction section, and the second mosaic section are added to, for example, the image processing device described above.

If the image processing device having the object recognition section 109 is mounted on a moving device such as an automobile, a controller that controls a warning operation or controls a movement direction or a movement speed of the moving device on the basis of object recognition results from the object recognition section 109 may be provided.

The moving device in the above Embodiment may be any device as long as it is a movable device such as a ship, an airplane, a robot, or a drone.

The image processing device in the above Embodiment may be an image processing device separate from the imaging device, or may be an image processing device included in the imaging device.

Fourth Embodiment

At least one of the various functions, processes and methods described in the above Embodiments may be realized by using a program. Hereinafter, in Fourth Embodiment, a program for realizing at least one of various functions, processes, and methods described in the above Embodiments will be referred to as a "program X". In Fourth Embodiment, a computer for executing the program X will be referred to as a "computer Y". A personal computer, a microprocessor, a central processing unit (CPU), and the like are examples of the computer Y. The computer of the imaging device or the image processing device in the above Embodiments is also an example of the computer Y.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

At least one of the various functions, processes, and methods described in the above Embodiments can be realized by the computer Y executing the program X. In this case, the program X is supplied to the computer Y via a computer-readable storage medium. The computer-readable storage medium in Fourth Embodiment includes at least one of a hard disk device, a magnetic storage device, an optical storage device, a magnetooptical storage device, a memory card, a ROM, a RAM, and the like. The computer-readable storage medium in Fourth Embodiment is a non-transitory storage medium.

This application claims the benefit of Japanese Patent Application No. 2021-057193 filed on Mar. 30, 2021, which is hereby incorporated by reference herein in its entirety.

What is claimed is:

1. An imaging device comprising:
   an imaging element;
   an optical system configured to form an image on an imaging surface of the imaging element and has a characteristic in which an image formation magnification differs depending on a position in the imaging surface; and
   at least one processor or circuit configured to function as
   a demosaic unit configured to generate color image data of at least two colors from the data output from the imaging element,
   a distortion correction unit configured to correct distortion of the color image data of at least two colors generated by the demosaic unit, and
   an optical correction unit configured to perform peripheral light quantity decrease correction or chromatic aberration correction on data output from the imaging element and provided before the demosaic unit.

2. The imaging device according to claim 1, the at least one processor or circuit configured to further function as:
   a mosaic unit configured to perform a mosaic process on the color image data of at least two colors of which the distortion has been corrected by the distortion correction unit.

3. The imaging device according to claim 2,
   wherein optical filters are arranged in a predetermined array on a front surface of the imaging element, and
   wherein the mosaic unit performs a mosaic process on the color image data of at least two colors on the basis of the predetermined array.

4. The imaging device according to claim 1, the at least one processor or circuit configured to further function as:
   a sensor correction unit configured to perform at least one of fixed pattern noise correction, scratch correction, and dark correction on data output from the imaging element and provided before the demosaic unit.

5. The imaging device according to claim 1,
   wherein optical filters are arranged in a predetermined arrangement on a front surface of the imaging element.

6. The imaging device according to claim 5,
   wherein the optical filters include an R filter and a B filter.

7. The imaging device according to claim 6,
   wherein the optical filters have an R filter, a G filter, and a B filter arranged in a Bayer array.

8. The imaging device according to claim 6,
   wherein the optical filters have an R filter, a B filter, and a colorless filter arranged in a Bayer array.

9. The imaging device according to claim 1,
   wherein the distortion correction unit corrects the distortion of the color image data of at least two colors and generates image data having different resolutions.

10. The imaging device according to claim 9,
    wherein the distortion correction unit generates high-resolution image data from a position in the imaging surface corresponding to a high image formation magnification, and generates low-resolution image data from a region including the position in the imaging surface corresponding to the high image formation magnification and a position in the imaging surface corresponding to a low image formation magnification.

11. The imaging device according to claim 9,
    wherein the distortion correction unit generates high-resolution image data from a position in the imaging surface corresponding to a high image formation magnification, and generates low-resolution image data from a position in the imaging surface corresponding to a low image formation magnification.

12. The imaging device according to claim 1,
    wherein the distortion correction unit includes
    an image data accumulation unit configured to accumulate the color image data of at least two colors generated by the demosaic unit,
    an output region selection unit configured to select a region of image data to be output at a predetermined resolution, an optical characteristic information storage unit configured to store optical characteristics of the optical system, a read region calculation unit configured to acquire optical characteristic information from the optical characteristic information storage unit based on the information input from the output region selection unit and to calculate a region to be read from the image data accumulation portion, an image data reading unit configured to read image data from the image data accumulation unit based on the information input from the read region calculation unit, and an interpolation processing unit configured to perform an interpolation process by using image data output from the image data reading unit.

13. An image processing device comprising:

an imaging element;

an optical system configured to form an image on an imaging surface of the imaging element and has a characteristic in which an image formation magnification differs depending on a position in the imaging surface; and at least one processor or circuit configured to function as a demosaic unit configured to generate color image data of at least two colors from the data output from the imaging element, a distortion correction unit configured to correct distortion of the color image data of at least two colors generated by the demosaic unit, an object recognition unit configured to perform object recognition based on the color image data of which the distortion has been corrected by the distortion correction unit, and a second distortion correction unit configured to further correct the distortion of the color image data input to the object recognition unit.

14. A moving device comprising:

an imaging element;

an optical system configured to form an image on an imaging surface of the imaging element and has a characteristic in which an image formation magnification differs depending on a position in the imaging surface; and at least one processor or circuit configured to function as a demosaic unit configured to generate color image data of at least two colors from the data output from the imaging element, a distortion correction unit configured to correct distortion of the color image data of at least two colors generated by the demosaic unit, an object recognition unit configured to perform object recognition based on the color image data of which the distortion has been corrected by the distortion correction unit, a controller configured to control a warning operation or controls a movement direction or a movement speed of the moving device based on a recognition result from the object recognition unit, and an optical correction unit configured to perform peripheral light quantity decrease correction or chromatic aberration correction on data output from the imaging element and provided before the demosaic unit.

15. A control method for an imaging device having an imaging element and an optical system configured to form an image on an imaging surface of the imaging element and has a characteristic in which an image formation magnification differs depending on a position in the imaging surface, the control method comprising:

demosaic processing of generating color image data of at least two colors from the data output from the imaging element;

correcting distortion of the color image data of at least two colors generated in the demosaic processing; and optical correction processing of performing peripheral light quantity decrease correction or chromatic aberration correction on data output from the imaging element and provided before the demosaic processing.

16. A non-transitory computer-readable storage medium configured to store a computer program for a computer of an imaging device to execute the following steps, the imaging device having an imaging element and an optical system configured to form an image on an imaging surface of the imaging element and has a characteristic in which an image formation magnification differs depending on a position in the imaging surface, the steps comprising:

demosaic processing of generating color image data of at least two colors from the data output from the imaging element;

correcting distortion of the color image data of at least two colors generated in the demosaic processing; and optical correction processing of performing peripheral light quantity decrease correction or chromatic aberration correction on data output from the imaging element and provided before the demosaic processing.

17. An imaging device comprising:

an imaging element;

an optical system configured to form an image on an imaging surface of the imaging element and has a characteristic in which an image formation magnification differs depending on a position in the imaging surface; and at least one processor or circuit configured to function as a demosaic unit configured to generate color image data of at least two colors from the data output from the imaging element, a distortion correction unit configured to correct distortion of the color image data of at least two colors generated by the demosaic unit, and a mosaic unit configured to perform a mosaic process on the color image data of at least two colors of which the distortion has been corrected by the distortion correction unit.

18. An imaging device comprising:

an imaging element;

an optical system configured to form an image on an imaging surface of the imaging element and has a characteristic in which an image formation magnification differs depending on a position in the imaging surface; and at least one processor or circuit configured to function as a demosaic unit configured to generate color image data of at least two colors from the data output from the imaging element, and a distortion correction unit configured to correct distortion of the color image data of at least two colors generated by the demosaic unit, wherein the distortion correction unit corrects the distortion of the color image data of at least two colors and generates image data having different resolutions.

19. An imaging device comprising:

an imaging element;

an optical system configured to form an image on an imaging surface of the imaging element and has a characteristic in which an image formation magnification differs depending on a position in the imaging surface; and at least one processor or circuit configured to function as
- a demosaic unit configured to generate color image data of at least two colors from the data output from the imaging element, and
- a distortion correction unit configured to correct distortion of the color image data of at least two colors generated by the demosaic unit, wherein the distortion correction unit includes:
- an image data accumulation unit configured to accumulate the color image data of at least two colors generated by the demosaic unit,
- an output region selection unit configured to select a region of image data to be output at a predetermined resolution,
- an optical characteristic information storage unit configured to store optical characteristics of the optical system,
- a read region calculation unit configured to acquire optical characteristic information from the optical characteristic information storage unit based on the information input from the output region selection unit and to calculate a region to be read from the image data accumulation portion,
- an image data reading unit configured to read image data from the image data accumulation unit based on the information input from the read region calculation unit, and
- an interpolation processing unit configured to perform an interpolation process by using image data output from the image data reading unit.

* * * * *